(12) United States Patent
Nyamwange et al.

(10) Patent No.: US 12,355,882 B2
(45) Date of Patent: Jul. 8, 2025

(54) MACHINE LEARNING BASED SYSTEM FOR OPTIMIZED CENTRAL PROCESSING UNIT (CPU) UTILIZATION IN DATA TRANSFORMATION

(71) Applicant: BANK OF AMERICA CORPORATION, Charlotte, NC (US)

(72) Inventors: Elvis Nyamwange, Little Elm, TX (US); Sailesh Vezzu, Hillsborough, NJ (US); Amer Ali, Jersey City, NJ (US); Rahul Shashidhar Phadnis, Charlotte, NC (US); Rahul Yaksh, Austin, TX (US); Hari Vuppala, Concord, NC (US); Pratap Dande, Saint Johns, FL (US); Brian Neal Jacobson, Los Angeles, CA (US); Erik Dahl, Newark, DE (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 211 days.

(21) Appl. No.: 18/209,022

(22) Filed: Jun. 13, 2023

(65) Prior Publication Data

US 2024/0421994 A1   Dec. 19, 2024

(51) Int. Cl.
*H04L 9/32*     (2006.01)
*G06N 20/00*    (2019.01)

(52) U.S. Cl.
CPC .............. *H04L 9/32* (2013.01); *G06N 20/00* (2019.01)

(58) Field of Classification Search
CPC .................................. H04L 9/32; G06N 20/00
See application file for complete search history.

(56) References Cited

U.S. PATENT DOCUMENTS

| | | |
|---|---|---|
| 9,417,929 B2 | 8/2016 | Fonseca |
| 10,402,733 B1 | 9/2019 | Li |
| 11,068,997 B1 | 7/2021 | Bermudez |
| 11,175,953 B2 | 11/2021 | Subramanian |
| 11,362,670 B2 | 6/2022 | Negishi |
| 11,372,469 B2 | 6/2022 | Bakalash |
| 11,567,807 B2 | 1/2023 | Dias |
| 11,640,563 B2 | 5/2023 | Higgins |
| 11,687,380 B2 | 6/2023 | Fawcett |
| 11,755,370 B2 | 9/2023 | Geigel |
| 11,797,876 B1 | 10/2023 | Wang |
| 11,922,217 B2 | 3/2024 | Chen |

(Continued)

*Primary Examiner* — Jonathan A Bui
(74) *Attorney, Agent, or Firm* — Moore & Van Allen PLLC; Anup Iyer

(57) ABSTRACT

Systems, computer program products, and methods are described herein for a machine learning based system for optimized CPU utilization in data transformation. The present disclosure is configured to receive a new data segment; retrieve characteristics of the new data segment; determine, using a trained machine learning model, an encryption algorithm, and a compression algorithm for implementation on the new data segment based on at least the characteristics of the new data segment; determine, using the trained machine learning model, an order of implementation associated with the implementation of the encryption algorithm and the compression algorithm; and implement the encryption algorithm and the compression algorithm on the new data segment in the determined order of implementation.

20 Claims, 6 Drawing Sheets

(56) References Cited

U.S. PATENT DOCUMENTS

| | | | |
|---|---|---|---|
| 2003/0229489 A1* | 12/2003 | Mes | G06F 9/3001 |
| | | | 704/200 |
| 2014/0129205 A1* | 5/2014 | Rolle | G06F 9/30156 |
| | | | 712/226 |
| 2022/0092464 A1 | 3/2022 | Wistuba | |
| 2023/0029920 A1 | 2/2023 | Gatson | |
| 2023/0071278 A1 | 3/2023 | Karri | |
| 2023/0088431 A1 | 3/2023 | Bychkovsky | |
| 2023/0131611 A1 | 4/2023 | Mohanty | |
| 2024/0012686 A1 | 1/2024 | Wang | |
| 2024/0045699 A1 | 2/2024 | Tang | |
| 2024/0127080 A1 | 4/2024 | Kim | |
| 2024/0184448 A1* | 6/2024 | Hong | G06F 3/0673 |

* cited by examiner

MACHINE LEARNING BASED SYSTEM FOR OPTIMIZED CENTRAL PROCESSING UNIT (CPU) UTILIZATION IN DATA TRANSFORMATION

TECHNOLOGICAL FIELD

Example embodiments of the present disclosure relate to a machine learning based system for optimized central processing unit (CPU) utilization in data transformation.

BACKGROUND

In today's digital landscape, the management and protection of data plays a crucial role in ensuring confidentiality, integrity, and efficiency. Entities across various industries rely on data transformation techniques such as encryption and compression to safeguard sensitive information, optimize storage and transmission resources, and maintain regulatory compliance.

Applicant has identified a number of deficiencies and problems associated with optimizing CPU utilization in data transformation. Through applied effort, ingenuity, and innovation, many of these identified problems have been solved by developing solutions that are included in embodiments of the present disclosure, many examples of which are described in detail herein

BRIEF SUMMARY

Systems, methods, and computer program products are provided for a machine learning based system for optimized CPU utilization in data transformation.

In one aspect, a system for a machine learning based system for optimized CPU utilization in data transformation is presented. The system comprising: a processing device; a non-transitory storage device containing instructions when executed by the processing device, causes the processing device to: receive a new data segment; retrieve characteristics of the new data segment; determine, using a trained machine learning model, an encryption algorithm, and a compression algorithm for implementation on the new data segment based on at least the characteristics of the new data segment; determine, using the trained machine learning model, an order of implementation associated with the implementation of the encryption algorithm and the compression algorithm; and implement the encryption algorithm and the compression algorithm on the new data segment in the determined order of implementation, wherein the encryption algorithm is determined based on a minimum number of CPU cycles needed to encrypt the new data segment, wherein the compression algorithm is determined based on a minimum number of CPU cycles needed to compress the new data segment, and wherein the order of implementation is determined based on a minimum number of CPU cycles needed to compress and encrypt the new data segment.

In some embodiments, executing the instructions further causes the processing device to: retrieve, from a data repository, archived data segments; receive, for each archived data segment, an encryption algorithm used to encrypt the archived data segment, characteristics of the archived data segment, and a number of CPU cycles taken to encrypt the archived data segment; and generate a first training dataset comprising the archived data segments, the encryption algorithm used to encrypt each archived data segment, the characteristics of each archived data segment, and the number of CPU cycles taken to encrypt each archived data segment.

In some embodiments, executing the instructions further causes the processing device to: receive, for each archived data segment, a compression algorithm used to compress the archived data segment, the characteristics of the archived data segment, and a number of CPU cycles taken to compress the archived data segment; and generate a second training dataset comprising the archived data segments, the compression algorithm used to compress each archived data segment, the characteristics of each archived data segment, and the number of CPU cycles taken to compress each archived data segment.

In some embodiments, the characteristics of each archived data segment comprises at least a data segment size, a data segment type, a data segment structure, data segment sensitivity, data segment format, and/or data segment complexity.

In some embodiments, executing the instructions further causes the processing device to: generate the trained machine learning model by training a machine learning model using the first training dataset and the second training dataset.

In some embodiments, executing the instructions further causes the processing device to: determine data processing requirements associated with the new data segment based on at least the characteristics of the new data segment, wherein the data processing requirements comprises at least an encryption requirement and a compression requirement.

In some embodiments, executing the instructions further causes the processing device to: determine that the encryption algorithm meets the encryption requirement associated with the new data segment; and implement the encryption algorithm on the new data segment based on at least determining that the encryption algorithm meets the encryption requirement.

In some embodiments, executing the instructions further causes the processing device to: determine that the compression algorithm meets the compression requirement associated with the new data segment; and implement the compression algorithm on the new data segment based on at least determining that the compression algorithm meets the compression requirement.

In another aspect, a computer program product for a machine learning based system for optimized CPU utilization in data transformation is presented. The computer program product comprising a non-transitory computer-readable medium comprising code causing an apparatus to: receive a new data segment; retrieve characteristics of the new data segment; determine, using a trained machine learning model, an encryption algorithm, and a compression algorithm for implementation on the new data segment based on at least the characteristics of the new data segment; determine, using the trained machine learning model, an order of implementation associated with the implementation of the encryption algorithm and the compression algorithm; and implement the encryption algorithm and the compression algorithm on the new data segment in the determined order of implementation, wherein the encryption algorithm is determined based on a minimum number of CPU cycles needed to encrypt the new data segment, wherein the compression algorithm is determined based on a minimum number of CPU cycles needed to compress the new data segment, and wherein the order of implementation is determined based on a minimum number of CPU cycles needed to compress and encrypt the new data segment.

In yet another aspect, a method for a machine learning based system for optimized CPU utilization in data transformation is presented. The method comprising: receiving a new data segment; retrieving characteristics of the new data segment; determining, using a trained machine learning model, an encryption algorithm, and a compression algorithm for implementation on the new data segment based on at least the characteristics of the new data segment; determining, using the trained machine learning model, an order of implementation associated with the implementation of the encryption algorithm and the compression algorithm; and implementing the encryption algorithm and the compression algorithm on the new data segment in the determined order of implementation, wherein the encryption algorithm is determined based on a minimum number of CPU cycles needed to encrypt the new data segment, wherein the compression algorithm is determined based on a minimum number of CPU cycles needed to compress the new data segment, and wherein the order of implementation is determined based on a minimum number of CPU cycles needed to compress and encrypt the new data segment.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
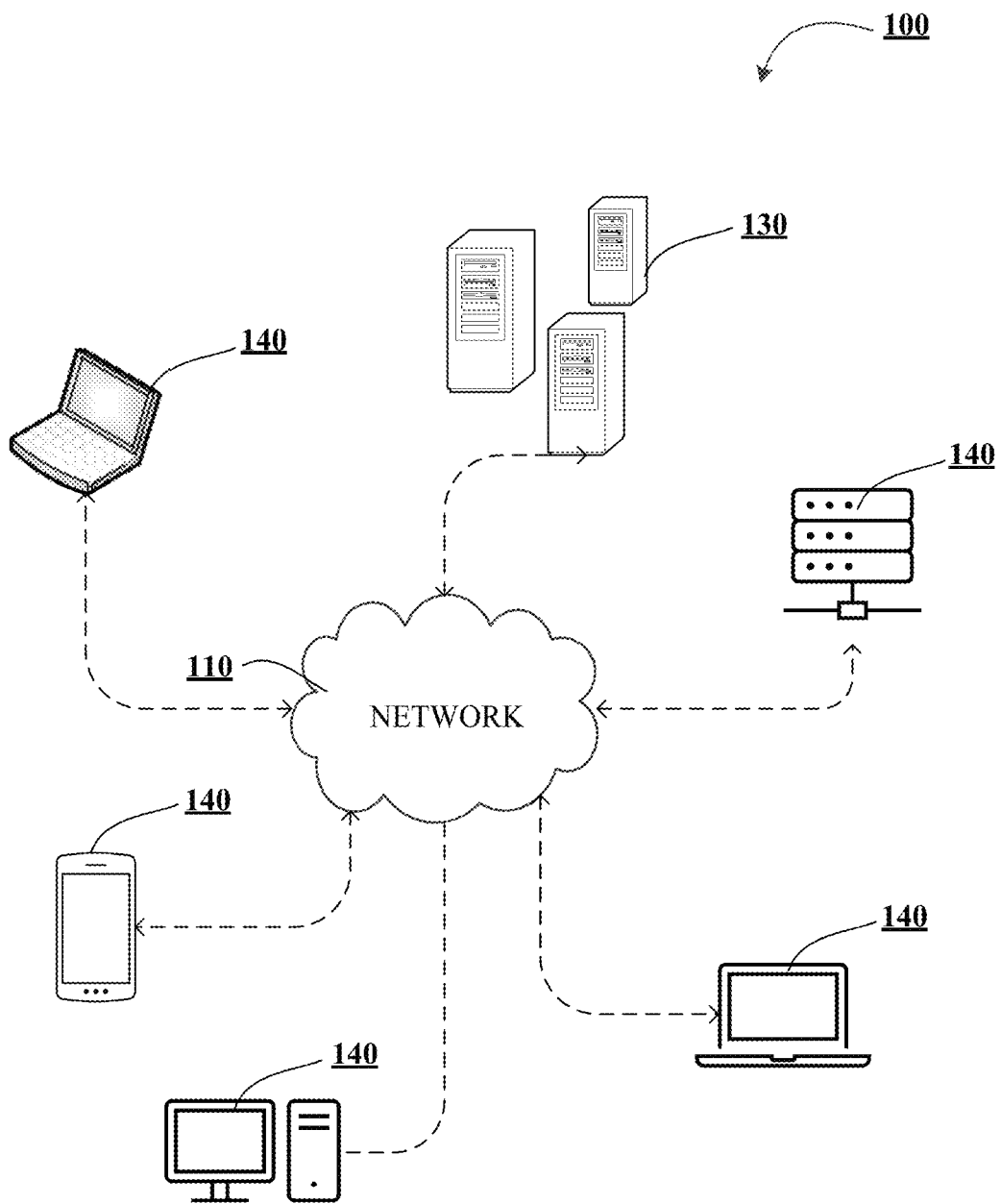
Figure 1B:
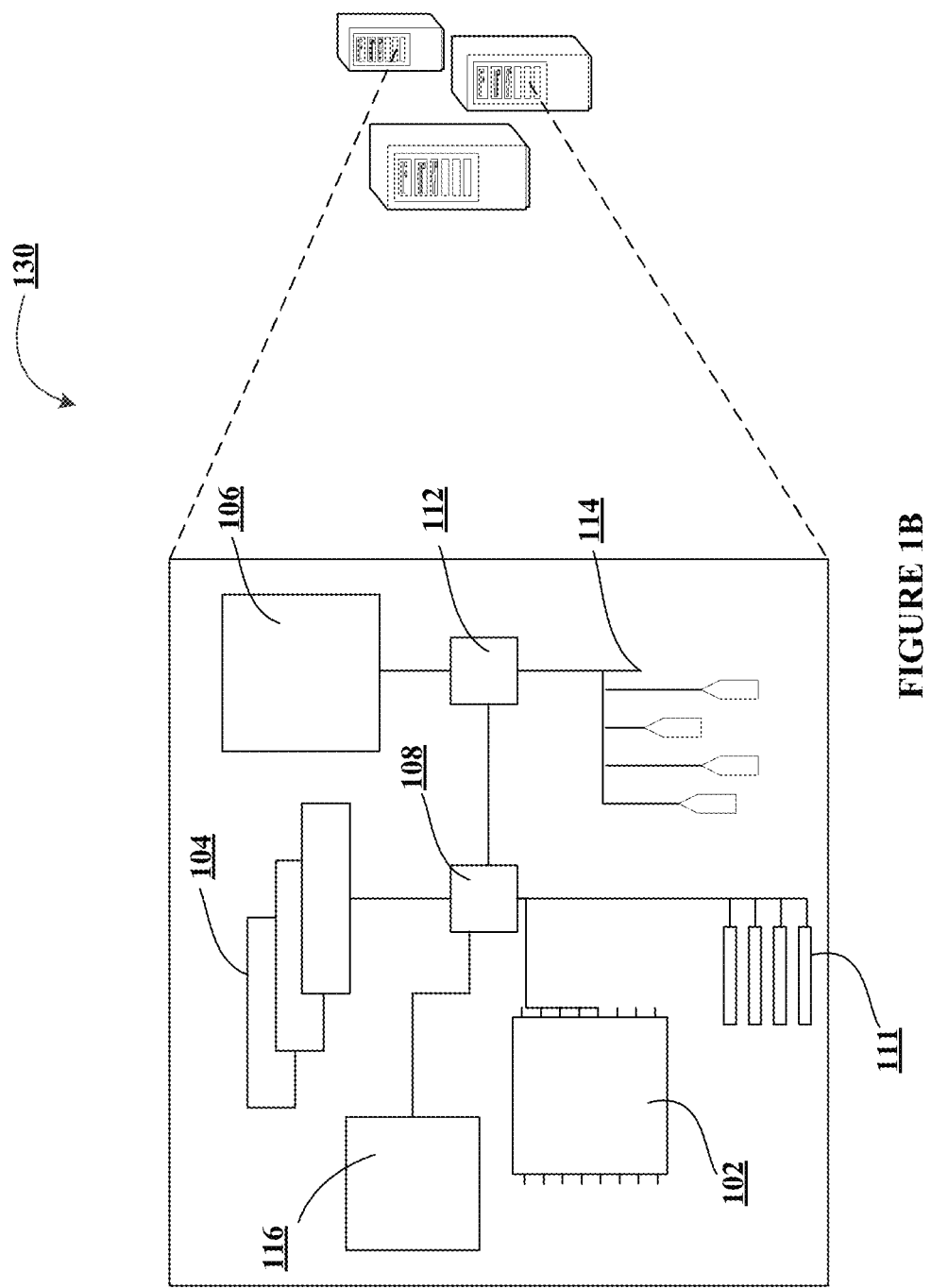
Figure 1C:
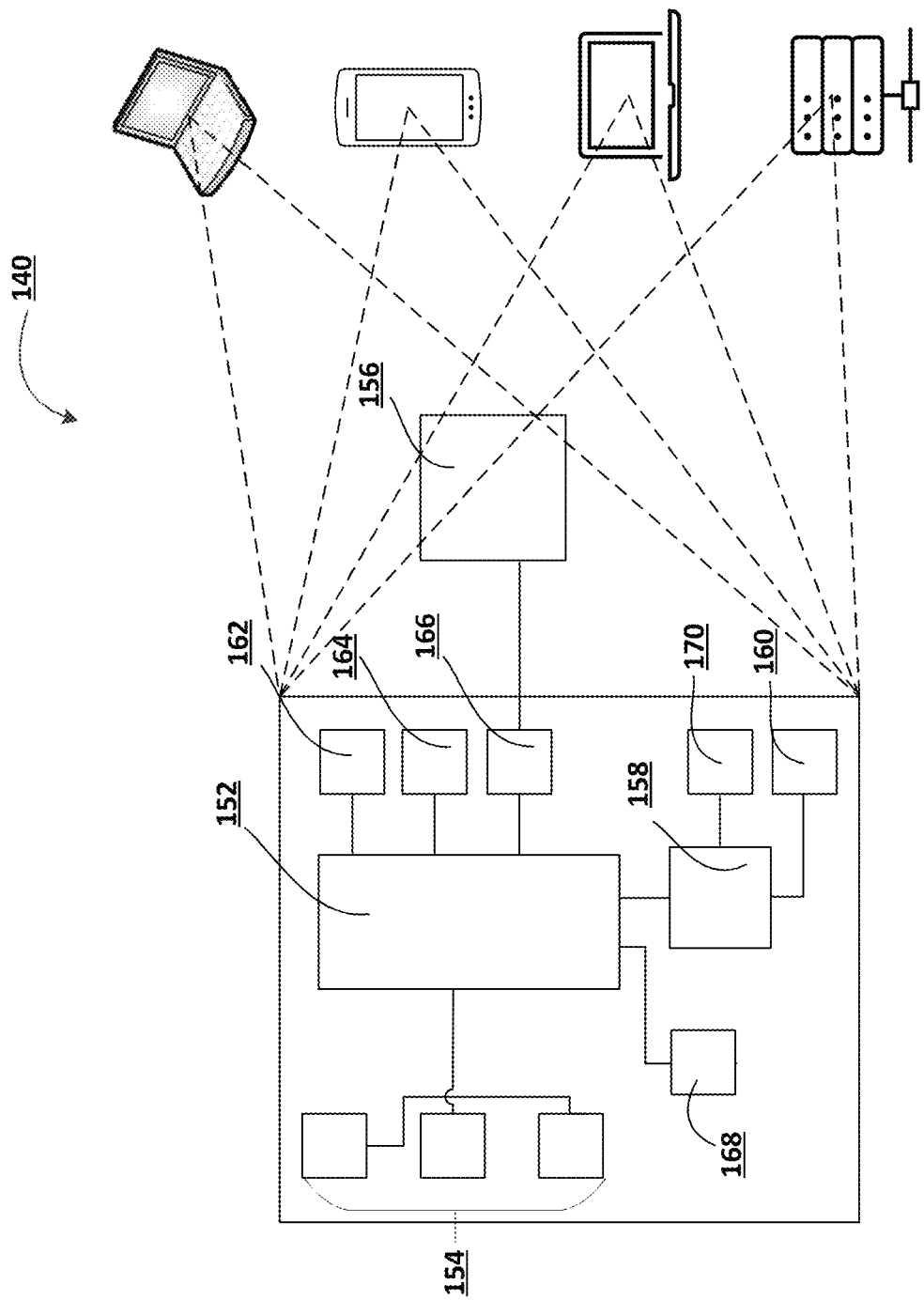
Figure 2:
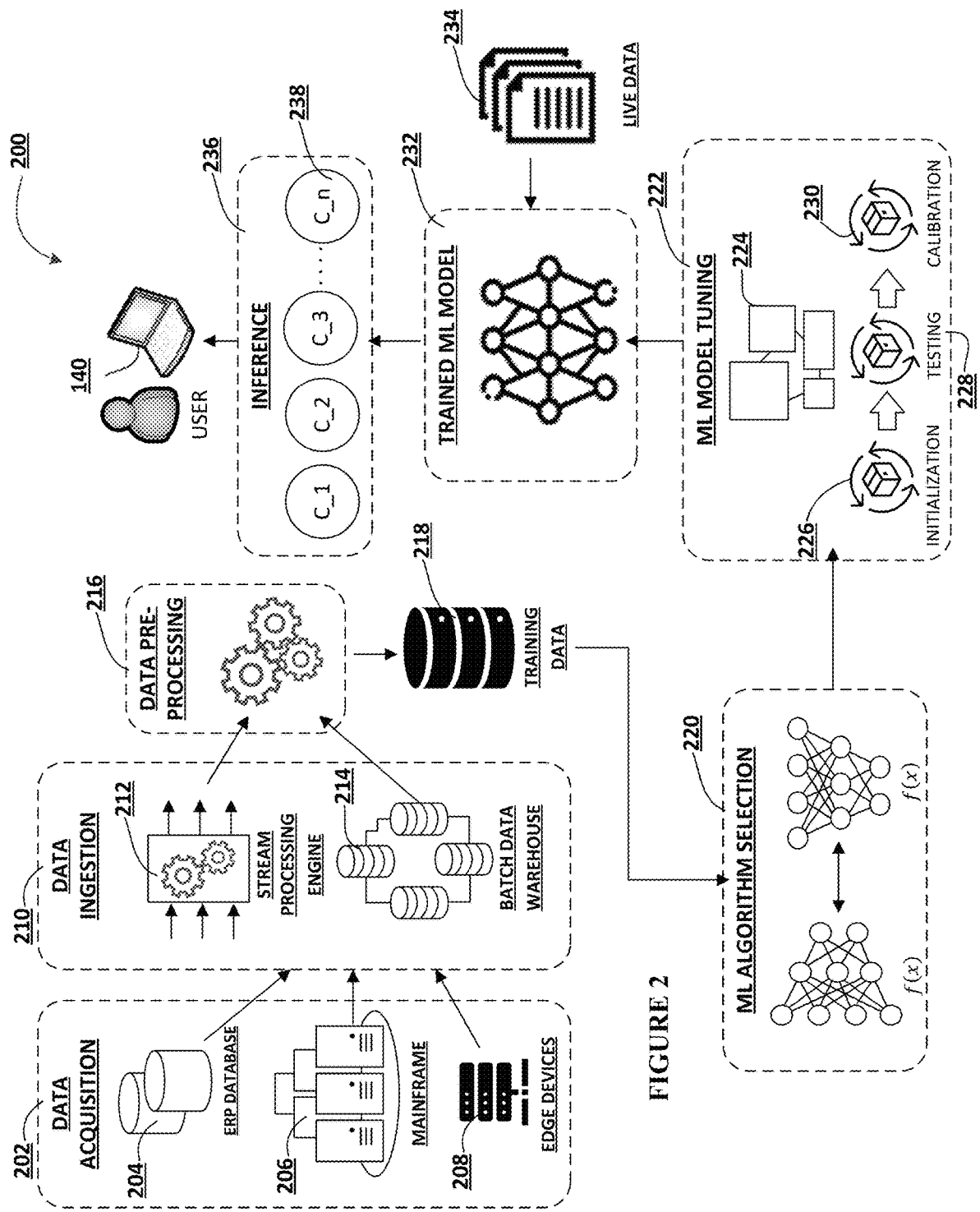
Figure 3:
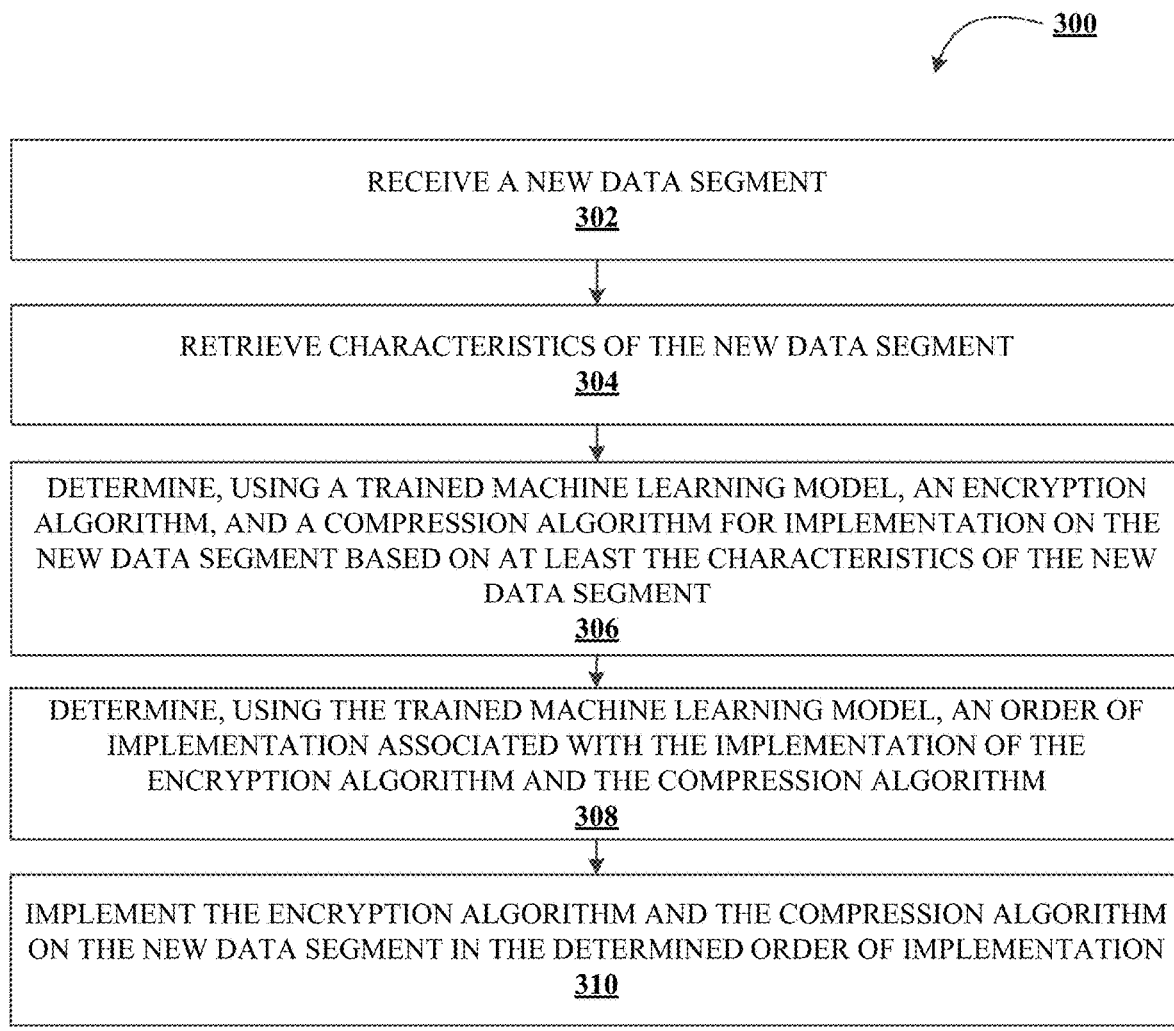
Figure 4:
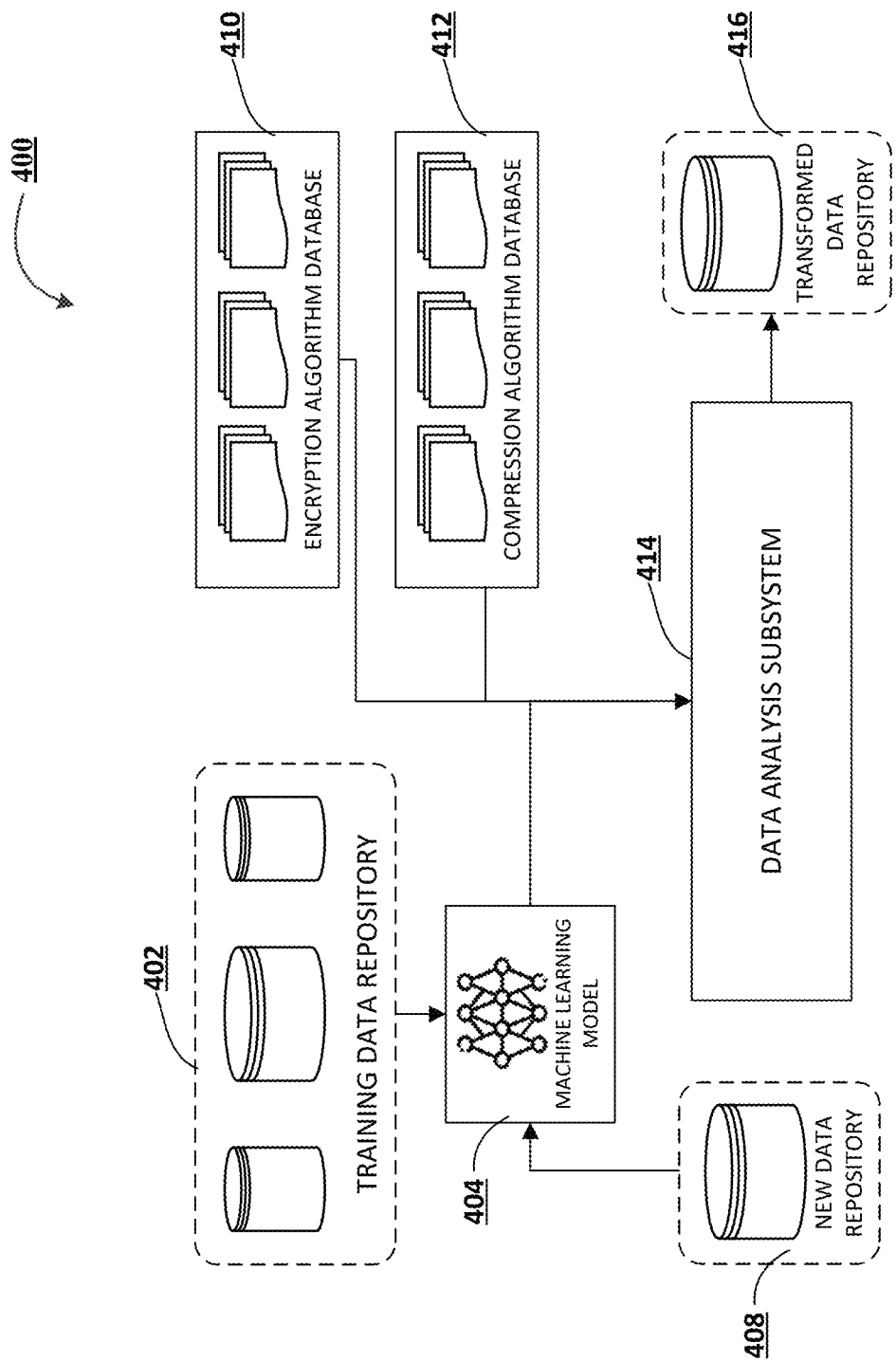

FIGS. 1A-1C illustrates technical components of an exemplary distributed computing environment for a machine learning based system for optimized CPU utilization in data transformation, in accordance with an embodiment of the disclosure;

FIG. 2 illustrates an exemplary machine learning (ML) subsystem architecture, in accordance with an embodiment of the invention;

FIG. 3 illustrates a process flow for a machine learning based system for optimized CPU utilization in data transformation, in accordance with an embodiment of the disclosure; and FIG. 4 illustrates an example data flow diagram for a machine learning based system for optimized CPU utilization in data transformation, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

Encryption is the process of converting data segments into an unreadable format, often referred to as ciphertext, using algorithms and cryptographic keys. By encrypting data segments, entities can protect it from unauthorized access, ensuring confidentiality and privacy. Encryption algorithms transform data segments in a way that can only be reversed using the correct decryption key. Compression, on the other hand, focuses on reducing the size of data segments. Compression algorithms eliminate redundancies, patterns, and inefficiencies within the data segments, resulting in a smaller representation. Compressed data segments require less storage space and often enable faster transmission times, thereby optimizing storage and network resources. The order of implementation, whether encryption before compression or compression before encryption, is a critical consideration when handling data.

Embodiments of the present invention leverage trained machine learning models to make informed decisions regarding encryption and compression strategies. These models analyze various characteristics of the data, such as size, type, sensitivity, and format, to determine the most appropriate encryption and compression algorithm. Additionally, the models consider the available computational resources, such as CPU cycles, to strike a balance between data security and processing efficiency.

FIGS. 1A-1C illustrate technical components of an exemplary distributed computing environment for a machine learning based system for optimized CPU utilization in data transformation 100, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, entertainment consoles, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture 200, in accordance with an embodiment of the invention. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., $C\_1$, $C\_2$ .... $C\_n$ 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., $C\_1$, $C\_2$ .... $C\_n$ 238) live data 234 based on how similar they are to one another to solve exploratory challenges where little is known about the data, provide a description or label (e.g., $C\_1$, $C\_2$ .... $C\_n$ 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIG. 3 illustrates a process flow for a machine learning based system for optimized CPU utilization in data transformation, in accordance with an embodiment of the disclosure. As shown in block 302, the process flow includes receiving a new data segment. A data segment may refer to qualitative or quantitative attributes or variables that are collected, stored, and processed to create information. A data segment may originate from various sources, such as transactions, user-generated, machine-generated, log data, sensor data, public data, scientific data, market data, and/or the like, and can be represented in different formats, such as tabular data, relational data, document-oriented data, hierarchical data, graph data, key-value data, and/or the like. In example embodiments, a new data segment may be stored in a data repository (e.g., new data repository), and can be fetched by the system for subsequent processing as per specific requirements.

As shown in block 304, the process flow includes retrieving characteristics of the new data segment. In some embodiments, the characteristics of a data segment (e.g., new data segment) may at least a data segment size. The data segment size may refer to the volume of the data segment. Larger data segments might require more computational resources for processing, and they may also influence the choice of encryption and compression algorithms. The size of the data can also affect the storage and retrieval speed. In some other embodiments, the characteristics of the new data segment may include a data segment type describing the kind of data contained in the segment, such as numerical, textual, image-based, audio, video, or other types. The type of data can impact the processing, encryption, and compression methods applied to the data segment. In still other embodiments, the characteristics of the new data segment may include a data segment structure. The data segment structure may relate to whether the data is structured, semi-structured, or unstructured. Structured data follows a specific format, like a database, while unstructured data, like text or images, does not follow a specific format. Semi-structured data lies in between, with some elements of structure (like JSON or XML files). The structure of the data segment can influence how the data is stored, processed, and retrieved. In still other embodiments, characteristics of the data segment may include data segment sensitivity. Data segment sensitivity may refer to a level of confidentiality or privacy required for the data. Sensitive data, such as personal or financial information, requires robust security measures, including encryption and access controls. The sensitivity level may also have implications for supervisory compliance. In still other embodiments, the characteristics of the data segment may include data segment format, i.e., the specific format in which the data is stored, such as CSV, JSON, XML, JPEG, MP3, and/or the like, which can impact how the data is parsed, processed, and read by different applications. In still other embodiments, the characteristics of the data segment may include data segment complexity in terms of its dimensions, relationships, and patterns. Complex data may require more advanced processing or analytical techniques to extract meaningful insights.

As shown in block 306, the process flow includes determining, using a trained machine learning model, an encryption algorithm, and a compression algorithm for implementation on the new data segment based on at least the characteristics of the new data segment. Encryption, in general, may refer to the process of converting plaintext data into a format that can't be understood by unauthorized users, typically called ciphertext. This conversion is done using an algorithm and a key. The key is used to decrypt the data, transforming the ciphertext back into its original form. Various encryption algorithms that may be used to encrypt plaintext data include AES (Advanced Encryption Standard), DES (Data Encryption Standard), 3DES (Triple DES), RSA (Rivest-Shamir-Adleman), Diffie-Hellman, ECC (Elliptic Curve Cryptography), and/or the like. In some embodiments, an encryption algorithm for implementation on a specific data segment may be selected based on data processing requirements, such as sensitivity and security requirements of the data, encryption requirements, the expected performance or throughput, compatibility with existing systems, methods for key management, adherence to regulatory standards, and/or the like. The data processing requirements may be determined based on at least the characteristics of the data segment, such as data segment volume, data segment velocity-speed at which the data segment is generated, captured, and processed, data segment variety-type and structure (e.g., structured, unstructured, or semi-structured) of the data segment, quality and reliability of the data segment, data value, security requirements, compliance requirements, and/or the like. These considerations will help ensure the encryption strategy aligns with the unique attributes and requirements of the data.

By using a trained machine learning model, the system may determine the most applicable encryption algorithm to be implemented on the new data segment that satisfies the data processing requirements associated therewith. In some embodiments, the machine learning model may be trained using archived data segments. Each archived data segment may be associated with a specific encryption algorithm that was used to encrypt the archived data segment, characteristics of the archived data segment, and a number of CPU cycles taken to encrypt the archived data segment. The archived data segments, associated encryption algorithms, characteristics of the archived data segment, and corresponding number of CPU cycles may be used as training data (e.g., first training dataset) to train the machine learning model. Once trained, the system may use the machine learning model to determine the most applicable encryption algorithm for implementation on the new data segment using pattern recognition and predictive analytics.

In some embodiments, the system may train the machine learning model to determine the encryption algorithm based on specific performance characteristics, such as minimizing CPU cycles required for the encryption process. Some encryption algorithms that provide high level of encryption may be more computationally intensive than others and using such encryption algorithms may slow down the overall system performance, especially when large volumes of data are being processed. However, encryption algorithms that provide low level of encryption may be less demanding on the CPU but may not meet the necessary data processing requirements (e.g., encryption requirement). By training the machine learning model on the archived data segments, associated encryption algorithms, and corresponding number of CPU cycles, the system may predict the encryption algorithm that best fits the new data segment. For example, if the new data segment includes highly sensitive data, the trained machine learning model might lean towards a more robust encryption algorithm, acknowledging the need for higher CPU usage as a necessary expense for ensuring data security. On the other hand, if the new data segment includes less sensitive data where data processing requirements (e.g., security requirements) are more relaxed, the trained machine learning model may favor an encryption algorithm that is less CPU-intensive, thereby preserving system performance without compromising data security. By continuously learning from each encryption task and the resultant system performance, the trained machine learning model can refine its decision-making process. Such an adaptive approach ensures an efficient utilization of resources while maintaining a high level of data protection, delivering a balanced solution to the encryption challenge.

Compression, in general, may refer to a technique used to reduce the size of data by eliminating redundancy. Compression is particularly useful for data storage and transmission purposes. Various compression algorithms that may be used to compress data include Huffman coding, LZ77 (Lempel-Ziv), Run-Length Encoding (RLE), JPEG (Joint Photographic Experts Group), MP3, and/or the like. Similarly, in some embodiments, a compression algorithm for implementation on a specific data segment may be selected based on at least the data processing requirements, such as level of acceptable data loss (lossless or lossy), the desired compression ratio, the speed of compression and decompression, the complexity and type of data, the available system resources allocated for processing the data segment, and/or the like. These considerations will ensure that the chosen compression strategy aligns effectively with the unique attributes and requirements of the data.

By using a trained machine learning model, the system may determine the most applicable compression algorithm to be implemented on the new data segment that satisfies the data processing requirements associated therewith. In some embodiments, the machine learning model may be trained using archived data segments. Each archived data segment may be associated with a specific compression algorithm that was used to compress the archived data segment, characteristics of the archived data segment, and a number of CPU cycles taken to compress the archived data segment. The archived data segments, associated compression algorithms, characteristics of the archived data segment, and corresponding number of CPU cycles may be used as training data (e.g., second training dataset) to train the machine learning model. Once trained, the system may use the machine learning model to determine the most applicable compression algorithm for implementation on the new data segment using pattern recognition and predictive analytics.

Similar to encryption, in some embodiments, the system may train the machine learning model to determine the compression algorithm based on specific performance characteristics, such as minimizing CPU cycles required for the encryption process. Compression algorithms vary in terms of the computational intensity needed to compress and decompress data. Highly efficient compression algorithms that significantly reduce data size often require more CPU cycles, potentially impacting system performance. On the other hand, less efficient algorithms may consume fewer CPU cycles but result in larger compressed data sizes, leading to increased storage and transmission costs. By training the machine learning model on the archived data segments, associated compression algorithms, and corresponding number of CPU cycles, the system may predict the compression algorithm that best fits the new data segment. For example, if the new data segment is voluminous but not required to be accessed frequently or quickly, the model may opt for a high-efficiency, CPU-intensive algorithm, recognizing that the trade-off in system performance is acceptable for the benefit of reduced storage costs. On the other hand, if the new data segment needs to be frequently accessed and quickly decompressed, such as in real-time analytics, the model might recommend a less CPU-intensive algorithm. Although this may result in larger compressed data sizes, the advantage lies in maintaining system performance and minimizing latency during data decompression. By considering both the characteristics of the new data segment and the available computational resources, the trained machine learning model can ensure a balanced approach to data compression. This not only optimizes storage and transmission costs but also maintains system performance, adapting to the dynamic requirements of each data segment. Once the best fit compression algorithm is determined, the system may confirm that the compression algorithm meets the data processing requirements (e.g., compression requirements), and in an instance in which the compression algorithm meets the data processing requirements, the system may implement the compression algorithm on the new data segment.

As shown in block 308, the process flow includes determining, using the trained machine learning model, an order of implementation associated with the implementation of the encryption algorithm and the compression algorithm. In some embodiments, a new data segment may require both encryption and compression to achieve optimal data protection and efficiency. While encryption may ensure the confidentiality and protection of a data segment by rendering it unreadable to unauthorized individuals, it does not address the efficient utilization of storage or transmission resources. Similarly, while compression reduces the size of data, allowing for more efficient use of storage resources, it does not address data protection. By applying both encryption and compression in the appropriate order, entities can achieve both enhanced security and efficient resource utilization. Encryption ensures data confidentiality, while compression reduces storage costs, speeds up data transmission, and optimizes network bandwidth usage.

In some embodiments, by using the trained machine learning model, the system may determine the appropriate order of implementation of the encryption algorithm and the compression algorithm. Accordingly, when training the machine learning model, the system may identify archived data segment that have undergone both encryption and compression, and identify the order in which the encryption and compression was performed on the archived data segment. The archived data segments, associated compression algorithms, associated encryption algorithms, order of implementation of the encryption algorithm and the compression algorithm, characteristics of the archived data segment, and corresponding number of CPU cycles may be used as training data to train the machine learning model. Additionally or alternatively, the machine learning model may be trained using both the first training dataset and the second training dataset. Once trained, the system may use the trained machine learning model to not only determine the most applicable encryption algorithm and compression algorithm for implementation on the new data segment, but also the appropriate order of implementation of the encryption algorithm and compression algorithm. Similar to encryption and compression, in some embodiments, the system may train the machine learning model to determine the order of implementation of the encryption algorithm and the compression algorithm based on specific performance characteristics, such as minimizing CPU cycles required for the encryption process.

While the trained machine learning model described herein is used to determine the encryption algorithm, the compression algorithm, and the order of implementation of the encryption algorithm and the compression algorithm, it is to be understood that individual instances of machine learning models may be used to determined each of the encryption algorithm, the compression algorithm, and the order of implementation of the encryption algorithm and the compression algorithm, or any combination thereof. For example, a first trained machine learning model may be used to determine the best fit encryption algorithm, a second trained machine learning model may be used to determine the best fit compression algorithm, and a third trained machine learning algorithm may be used to determine the order of implementation of the encryption algorithm and compression algorithm.

As shown in block 310, the process flow includes implementing the encryption algorithm and the compression algorithm on the new data segment in the determined order of implementation. Once the best fit encryption algorithm is determined, the system may confirm that the encryption algorithm meets the data processing requirements (e.g., encryption requirements), and in an instance in which the encryption algorithm meets the data processing requirements, the system may implement the encryption algorithm on the new data segment. Similarly, once the best fit compression algorithm is determined, the system may confirm that the compression algorithm meets the data processing requirements (e.g., compression requirements), and in an instance in which the compression algorithm meets the data processing requirements, the system may implement the compression algorithm on the new data segment. Similarly, once the order of implementation of the encryption algorithm and the compression algorithm is determined, the system may confirm that the order of implementation of the encryption algorithm and the compression algorithm meet the data processing requirements. In an instance in which the order of implementation meets the data processing requirements, the system may implement the encryption algorithm and the compression algorithm on the new data segment in the determined order of implementation.

FIG. 4 illustrates an example data flow diagram for a machine learning based system for optimized CPU utilization in data transformation, in accordance with an embodiment of the disclosure. As shown in FIG. 4, the machine learning model 404 may be trained using data (e.g., first training data set, second training dataset) stored in the training data repository 402. Once trained, the machine learning model 404 may be used to determine the encryption algorithm, the compression algorithm, and the order of implementation of the encryption algorithm and the compression algorithm on the new data segment received from the new data repository 408. The data analysis subsystem 414 may implement the encryption algorithm and the compression algorithm on the new data segment in the determined order of implementation. The data analysis subsystem 414 may retrieve the necessary encryption algorithm from the encryption algorithm database 410 and the necessary compression algorithm from the compression algorithm database 412. In response to implementing the encryption algorithm and the compression algorithm on the new data segment in the determined order of implementation, the transformed new data segment is then stored in a transformed data repository 416.

Embodiments of the present disclosure are described below with reference to block diagrams and flowchart illustrations. Thus, it should be understood that each block of the block diagrams and flowchart illustrations may be implemented in the form of a computer program product; an entirely hardware embodiment; an entirely firmware embodiment; a combination of hardware, computer program products, and/or firmware; and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for a machine learning based system for optimized CPU utilization in data transformation, the system comprising:
    a processing device;
    a non-transitory storage device containing instructions when executed by the processing device, causes the processing device to:
    receive a new data segment;
    retrieve characteristics of the new data segment;
    determine, using a trained machine learning model, an encryption algorithm, and a compression algorithm for implementation on the new data segment based on at least the characteristics of the new data segment;
    determine, using the trained machine learning model, an order of implementation associated with the implementation of the encryption algorithm and the compression algorithm; and
    implement the encryption algorithm and the compression algorithm on the new data segment in the determined order of implementation,
    wherein the encryption algorithm is determined based on a minimum number of CPU cycles needed to encrypt the new data segment,
    wherein the compression algorithm is determined based on a minimum number of CPU cycles needed to compress the new data segment, and
    wherein the order of implementation is determined based on a minimum number of CPU cycles needed to compress and encrypt the new data segment.

2. The system of claim 1, wherein executing the instructions further causes the processing device to:
    retrieve, from a data repository, archived data segments;
    receive, for each archived data segment, an encryption algorithm used to encrypt the archived data segment, characteristics of the archived data segment, and a number of CPU cycles taken to encrypt the archived data segment; and
    generate a first training dataset comprising the archived data segments, the encryption algorithm used to encrypt each archived data segment, the characteristics of each archived data segment, and the number of CPU cycles taken to encrypt each archived data segment.

3. The system of claim 2, wherein executing the instructions further causes the processing device to:
    receive, for each archived data segment, a compression algorithm used to compress the archived data segment, the characteristics of the archived data segment, and a number of CPU cycles taken to compress the archived data segment; and
    generate a second training dataset comprising the archived data segments, the compression algorithm used to compress each archived data segment, the characteristics of each archived data segment, and the number of CPU cycles taken to compress each archived data segment.

4. The system of claim 3, wherein the characteristics of each archived data segment comprises at least a data segment size, a data segment type, a data segment structure, data segment sensitivity, data segment format, and/or data segment complexity.

5. The system of claim 3, wherein executing the instructions further causes the processing device to:
    generate the trained machine learning model by training a machine learning model using the first training dataset and the second training dataset.

6. The system of claim 1, wherein executing the instructions further causes the processing device to:
    determine data processing requirements associated with the new data segment based on at least the characteristics of the new data segment, wherein the data processing requirements comprises at least an encryption requirement and a compression requirement.

7. The system of claim 6, wherein executing the instructions further causes the processing device to:
    determine that the encryption algorithm meets the encryption requirement associated with the new data segment; and
    implement the encryption algorithm on the new data segment based on at least determining that the encryption algorithm meets the encryption requirement.

8. The system of claim 6, wherein executing the instructions further causes the processing device to:
    determine that the compression algorithm meets the compression requirement associated with the new data segment; and
    implement the compression algorithm on the new data segment based on at least determining that the compression algorithm meets the compression requirement.

9. A computer program product for a machine learning based system for optimized CPU utilization in data transformation, the computer program product comprising a non-transitory computer-readable medium comprising code causing an apparatus to:
    receive a new data segment;
    retrieve characteristics of the new data segment;
    determine, using a trained machine learning model, an encryption algorithm, and a compression algorithm for implementation on the new data segment based on at least the characteristics of the new data segment;
    determine, using the trained machine learning model, an order of implementation associated with the implementation of the encryption algorithm and the compression algorithm; and
    implement the encryption algorithm and the compression algorithm on the new data segment in the determined order of implementation,
    wherein the encryption algorithm is determined based on a minimum number of CPU cycles needed to encrypt the new data segment,
    wherein the compression algorithm is determined based on a minimum number of CPU cycles needed to compress the new data segment, and wherein the order of implementation is determined based on a minimum number of CPU cycles needed to compress and encrypt the new data segment.

10. The computer program product of claim 9, wherein the code further causes the apparatus to:
retrieve, from a data repository, archived data segments;
receive, for each archived data segment, an encryption algorithm used to encrypt the archived data segment, characteristics of the archived data segment, and a number of CPU cycles taken to encrypt the archived data segment; and
generate a first training dataset comprising the archived data segments, the encryption algorithm used to encrypt each archived data segment, the characteristics of each archived data segment, and the number of CPU cycles taken to encrypt each archived data segment.

11. The computer program product of claim 10, wherein the code further causes the apparatus to:
receive, for each archived data segment, a compression algorithm used to compress the archived data segment, the characteristics of the archived data segment, and a number of CPU cycles taken to compress the archived data segment; and
generate a second training dataset comprising the archived data segments, the compression algorithm used to compress each archived data segment, the characteristics of each archived data segment, and the number of CPU cycles taken to compress each archived data segment.

12. The computer program product of claim 11, wherein the characteristics of each archived data segment comprises at least a data segment size, a data segment type, a data segment structure, data segment sensitivity, data segment format, and/or data segment complexity.

13. The computer program product of claim 11, wherein the code further causes the apparatus to:
generate the trained machine learning model by training a machine learning model using the first training dataset and the second training dataset.

14. The computer program product of claim 9, wherein the code further causes the apparatus to:
determine data processing requirements associated with the new data segment based on at least the characteristics of the new data segment, wherein the data processing requirements comprises at least an encryption requirement and a compression requirement.

15. The computer program product of claim 14, wherein the code further causes the apparatus to:
determine that the encryption algorithm meets the encryption requirement associated with the new data segment; and
implement the encryption algorithm on the new data segment based on at least determining that the encryption algorithm meets the encryption requirement.

16. The computer program product of claim 14, wherein the code further causes the apparatus to:
determine that the compression algorithm meets the compression requirement associated with the new data segment; and
implement the compression algorithm on the new data segment based on at least determining that the compression algorithm meets the compression requirement.

17. A method for a machine learning based system for optimized CPU utilization in data transformation, the method comprising:
receiving a new data segment;
retrieving characteristics of the new data segment;
determining, using a trained machine learning model, an encryption algorithm, and a compression algorithm for implementation on the new data segment based on at least the characteristics of the new data segment;
determining, using the trained machine learning model, an order of implementation associated with the implementation of the encryption algorithm and the compression algorithm; and
implementing the encryption algorithm and the compression algorithm on the new data segment in the determined order of implementation,
wherein the encryption algorithm is determined based on a minimum number of CPU cycles needed to encrypt the new data segment,
wherein the compression algorithm is determined based on a minimum number of CPU cycles needed to compress the new data segment, and
wherein the order of implementation is determined based on a minimum number of CPU cycles needed to compress and encrypt the new data segment.

18. The method of claim 17, wherein the method further comprises:
retrieving, from a data repository, archived data segments;
receiving, for each archived data segment, an encryption algorithm used to encrypt the archived data segment, characteristics of the archived data segment, and a number of CPU cycles taken to encrypt the archived data segment; and
generating a first training dataset comprising the archived data segments, the encryption algorithm used to encrypt each archived data segment, the characteristics of each archived data segment, and the number of CPU cycles taken to encrypt each archived data segment.

19. The method of claim 18, wherein the method further comprises:
receive, for each archived data segment, a compression algorithm used to compress the archived data segment, the characteristics of the archived data segment, and a number of CPU cycles taken to compress the archived data segment; and
generate a second training dataset comprising the archived data segments, the compression algorithm used to compress each archived data segment, the characteristics of each archived data segment, and the number of CPU cycles taken to compress each archived data segment.

20. The method of claim 18, wherein the characteristics of each archived data segment comprises at least a data segment size, a data segment type, a data segment structure, data segment sensitivity, data segment format, and/or data segment complexity.

\* \* \* \* \*